United States Patent [19]

Deregibus

[11] Patent Number: 4,856,720
[45] Date of Patent: Aug. 15, 1989

[54] HELICAL WINDING APPARATUS

[75] Inventor: Alfio Deregibus, Padova, Italy

[73] Assignee: The Goodyear Tire & Rubber Company, Akron, Ohio

[21] Appl. No.: 593,198

[22] Filed: Mar. 27, 1984

Related U.S. Application Data

[60] Continuation of Ser. No. 440,160, Nov. 8, 1982, abandoned, which is a continuation of Ser. No. 256,345, Apr. 21, 1981, abandoned, which is a continuation of Ser. No. 124,681, Feb. 26, 1980, abandoned, which is a division of Ser. No. 29,801, Apr. 13, 1979, abandoned.

[51] Int. Cl.$^4$ ............................................ B65H 81/08
[52] U.S. Cl. .................................. 242/7.02; 242/7.22; 242/7.23; 156/429
[58] Field of Search ..................... 242/7.23, 7.21, 7.20, 242/7.02, 7.15; 156/425, 428, 446, 429

[56] References Cited

U.S. PATENT DOCUMENTS

| | | | |
|---|---|---|---|
| 690,353 | 12/1901 | Brewster | 242/7.23 |
| 1,990,237 | 2/1935 | Lloyd | 242/7.22 |
| 2,352,255 | 6/1944 | Davis | 57/11 |
| 2,914,262 | 11/1959 | Ludvigsen | 242/7.14 |
| 3,187,494 | 6/1965 | Fuller | 57/11 |
| 3,497,413 | 2/1970 | Ullman et al. | 156/425 |
| 3,519,520 | 7/1970 | Newman et al. | 156/431 |
| 3,823,883 | 7/1974 | Fenci et al. | 242/7.02 |

Primary Examiner—John M. Jillions
Attorney, Agent, or Firm—William A. Drucker; Marc R. Dion, Sr.

[57] ABSTRACT

In a method of fabricating hose, especially in very long unbroken lengths, an elongated core is mounted for rotation without longitudinal displacement and is driven simultaneously at both of its ends at a selected fixed speed. A bobbin having a length of tape wound on it is moved on a carrier along a path parallel to the length of the core, and the tape of the bobbin is wound helically onto the core while the core is rotating and the carrier is moving along the path. There may be plural bobbins, and the carrier may have a platform for a human operator who manipulates the bobbin from which tape is being wound. Tape from selected successive bobbins may be so wound in helical manner.

1 Claim, 1 Drawing Sheet

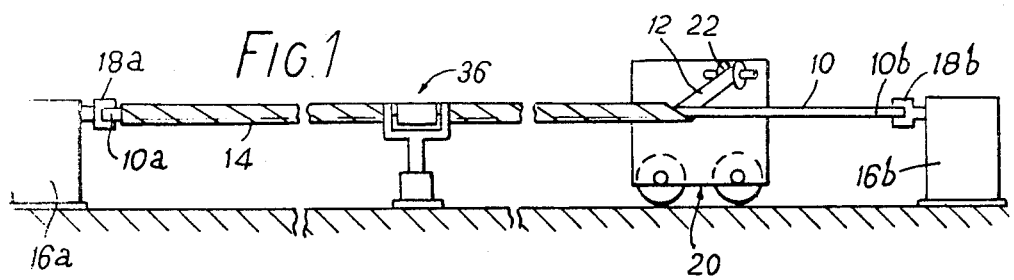
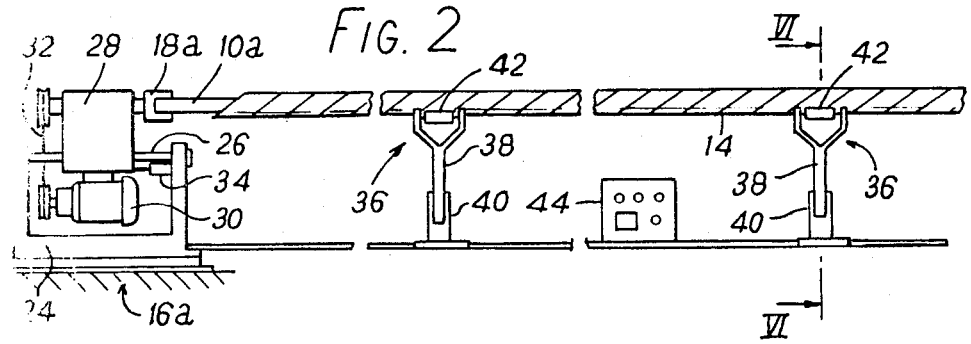
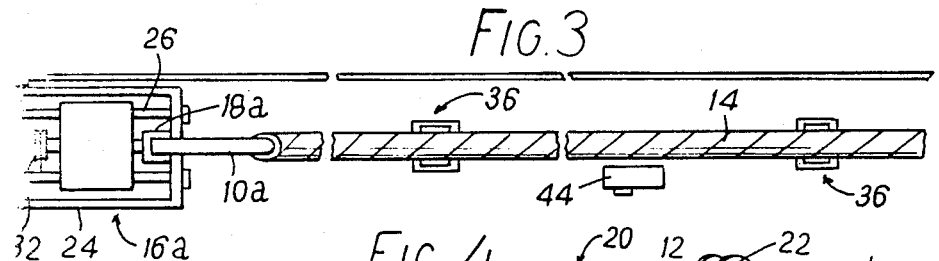
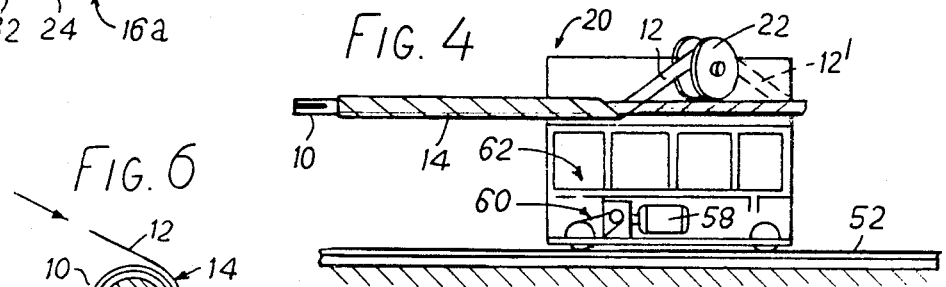
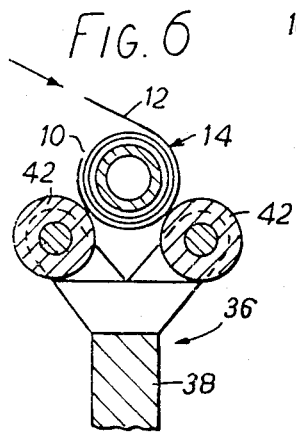
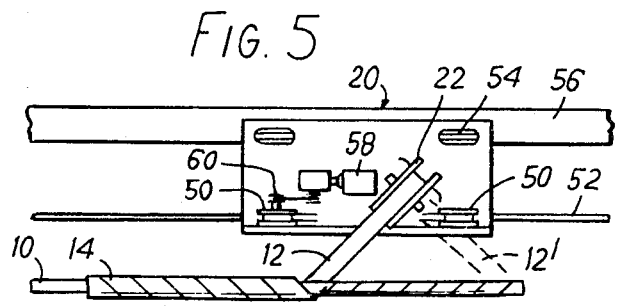

HELICAL WINDING APPARATUS

This application is a continuation of application Ser. No. 440,160, filed 11-8-82 abandoned which is a continuation application of Ser. No. 256,345 filed 4-21-81 abandoned which was filed as a continuation of Ser. No. 124,681 filed 2-26-80 abandoned which was filed as a division of Ser. No. 029,801 filed 4-13-79 abandoned.

BACKGROUND OF THE INVENTION

1. Field of the Invention

This invention concerns equipment for the so-called "manufacture" of rubber hose, natural or synthetic, but which can be vulcanized, and possibly incorporating reinforcing fabric layers, a manufacture which, as is known, is carried out by winding at least one layer and, generally, a number of layers of vulcanizable rubber tapes, possibly connected to a fabric layer, around a mandrel (or "core") generally metallic. In particular, this invention concerns equipment suited to the manufacture of rubber hose, as mentioned above, and characterized by particular technical solutions, described below, such as to permit industrial production, with conditions of high efficiency and obtaining high quality and uniform products, in tubular pieces of great length, for example in the region of 100 meters or more, in such a way as to allow the installation of hose (such as aqueducts, oil pipelines, gas pipelines) involving a proportionally very small number of joints.

More specifically, this invention concerns equipment for the industrial uses described, or equivalent, and suited to constitute an operative element or unit of a complete plant for the fabrication of pieces of hose, of great length, in natural or synthetic rubber, such a plant being subject of another contemporaneous application by the same applicant, to whose context reference is herein made, for better understanding of some technical and industrial presuppositions of this same invention.

Moreover, the above-mentioned application of this invention does not constitute a limitation of the domain of the patent application, in that the invention could find advantageous industrial use in equivalent fields, for example for the formation of vulcanizable rubber tapes, destined for various uses, for example for the winding and the manufacture of shaped bodies with a non uniform diameter and/or cross section.

2. Description of the Prior Art

The formation of pieces of great length necessarily presupposes the observance of particular technical requirements and conditions, and the solution of particular technical problems which do not appear to have been resolved totally or considered in depth by the technique of the art, according to which the industrial production is limited to obtaining much shorter pieces of hose, at most in the range of some tens of metres in length. These technical problems concern, in particular:

the support of cores of corresponding great length, in conditions such as to prevent, if not within limits of camber, practically unavoidable and non-influential, bending and flexure, under the action of the gravity which is exerted on to the mass of the core and also the material progressively wound around the said core;

the action, or more exactly the rotation of the said core, without causing twisting deformations distributed along the said great length of the same;

the correct and uniform carrying out of the winding operations, around the said core and along its entire working length, of rubber tapes, with or without reinforcement, and of materials possibly other than rubber (for example, tapes or metal thread, or other) used for the reinforcement of the hose produced.

SUMMARY OF THE INVENTION

With the aim of finding the solution to the above mentioned technical problems, and of also obtaining the above-mentioned and other quantitative and qualitative advantages of industrial production, the equipment of this invention is characterized substantially by comprising a "line" of processing or more correctly of handling, including, in combination, operative heads placed at the extremities of the core in its turn destined to be rotated and to receive the winding in particular of a number of over-lapping helical windings, at least in part with an opposite winding direction, with the tapes destined to jointly form the hose, each head including at least one mandrel which engages the extremities of the said core both axially and torsionally, powered means to set the said mandrels in rotation, in conditions of rigorous and constant phase of synchronism, assured in particular by an interconnection of the said powered means by an "electric axis", means to exert an axial movement on at least one of the said mandrels, to put the said core under tension, means for supporting the core, to subdivide its length into sufficiently short stretches so that any bending that may occur within the single stretches becomes practically negligible, the said support means being such as to not disturb the rotation of the said core nor the winding of the tapes around the same, and at least one trolley supported and guided in a movable manner in a direction strictly parallel to the axis of the core thus supported and operated, and including support means for the bobbin or bobbins of tapes to be wound around the core, and powered means suited to impart to the trolley alternating movements along the entire length of the line, to carry out the winding, with a traverse speed selectively predeterminable in relation to the rotation speed of the core, in order to assure a regular and uniform carrying out of the helical winding, with a predetermined slant and pitch.

These and other characteristics of the invention will appear in the course of the following detailed description of a non-limitative example of the operation of the same, and reproduced, with some simplifications and omissions in purely constructive details as well as in various components and structural, mechanical and electrical means, individually obtainable by applying current technical knowledge, in the drawings.

BRIEF DESCRIPTION OF THE DRAWINGS

FIG. 1 shows the equipment, in side view, with various interruptions and shortenings in the longitudinal direction, necessary in view of the dimensions of the drawing;

FIG. 2 shows details of one of the extremities of the equipment and the means connected to it;

FIG. 3 shows the subject of FIG. 2, viewed from above;

FIG. 4 shows a side view of a portion of the equipment of FIGS. 2 and 3, in which the trolley which carries out the application of the tapes and the formation by helical winding, is temporarily present and in action, and the tapes are wound progressively along the entire length and in both directions of the product in course of manufacture;

FIG. 5 shows seen from above, the subject of FIG. 4;

FIG. 6 shows a detail, in section in a vertical plane perpendicular to the axis of the article in the course of manufacture, of an example of any one of the support means distributed along the length of the latter.

DESCRIPTION OF THE PREFERRED EMBODIMENTS

With particular reference to the Figures of the drawing: the equipment as a whole as schematically represented in FIG. 1 comprises in combination and in operative association a first system which supports, holds in position and sets in rotation a core 10 (in general metallic, whether or not tubular) around which the hose must be manufactured, and therefore having an equal length (with the necessary prudent excess) and a second system which carries out the winding of a rubber tape 12, possibly reinforced or coupled to a fabric, in order to produce the semi-finished article, in practice the rubber hose shown at 14 and destined to be finished by means of a suitable vulcanization treatment.

The first system comprises two groups of "heads" 16a and 16b contra-opposed and symmetrically arranged at the extremities of an alignment defined by the axis of the said core and of the article, each head comprising mandrels 18a and 18b having conventional chuck means for engaging and grasping the respective extremities 10a and 10b of the core 10, and powered means to operate the said mandrels, as well as other complementary means described below.

The second system comprises a trolley 20 moving and guided between both of the said heads in a direction strictly parallel to the said axis and including means (even manual) for the support of at least one bobbin 22 from which the tape 12 is progressively wound, in concordance with the movement of the said trolley and with the rotation of the said core, in order to carry out the helical winding of the raid tape around the said core.

Obviously, given that in general this hose is manufactured by superimposing a number of layers of tape (at least some of which can be coupled to fabric and/or connected or integrated by winding to other materials, such as threads or metallic tape, or other) and given that the tapes or other superimposed materials are wound in a crossed helical way, the manufacturing process of the tubular article includes two or more passages of the trolley 20, in both directions, along its entire length.

Some details of particular interest for the production and the service of the equipment are represented in FIGS. 2 and 6. At least one and preferably both of the heads comprise, as represented in FIGS. 2 and 3 and with the opposite head assumed to be symmetrically equal to the one represented, a supporting frame 24 on which, for example by means of support rods 26 horizontal and parallel to each other and to the axis of the core, sliding blocks 28 are mounted carrying the shafts of the said mandrels 10, as well as powered means 30 and transmission 32 for the operation of the respective mandrels. These blocks 28 can be moved for example by means of hydraulic or pneumatic jacks 34 (FIG. 2), in a direction away from the opposite head 16, in such a way as to put the core 10 in a state of tension such as to assure its straightness. The jacks 34 can readily be simultaneously and equally pressurized to apply equal and opposite pull at each end of the core.

Moreover, given the considerable length of these cores 10, they inevitably taken on, due to their dead weight added to that of the article 14 in the course of manufacture around it, a catenary shape. This curvature is controlled or at least contained within acceptable values by subdividing the length of the line into two or more "stretches" by means of a number of support devices shown as a whole by 36 suitably spaced along the said length.

Preferably these support devices include at least one riser 38 each supported in a manually adjustable manner in height, for example inserted in vertically slidably manner in a base 40, and securable by a stop or clamp (not shown) at different heights therein, and this riser supports, on its upper extremity (note details in FIG. 6) at least a pair of rollers 42 freely rotating around axes also parallel to the axis of the core 10 arranged at a lower level than the latter axis as well as symmetrically to the two sides of the same, in such a way as to form a tribometer system of support, rotating freely, for the mandrel 10 and the article 14 in course of manufacture around it. Obviously, the interval between the said rollers 42 must be less than the diameter of the mandrel 10. This support system, as can be seen from FIG. 6, does not disturb the process of winding and the trolley 20 can pass over the various supports 36 in its movements without prejudicing the regularity of the operation.

In accordance with an important characteristic of the invention, the motors 30 belonging to the two heads are operated and commanded in such a way as to operate in their turn the respective mandrels 18 in conditions of strict synchronism and phase. For example, these motors are fed with a continuous current, or else with alternating current but produced by systems adapted to supply a variable frequency and they are interconnected by a known system, usually called "electric axis", which guarantees the said conditions of phase and synchronism. The feeding of the motors of the heads is assured and controlled for example by an electric control board 44 (FIGS. 2 and 3) provided with the known command and control gear for obtaining synchronized operation of the two motors and for preventing any marginal torque between the two heads, and preferably with means for the planning of the rotation speeds, according to predetermined cycles (for example, for winding with a different "pitch", during the various passages, according to the material to be wound).

In its turn, the trolley 20 (the equipment could also include more trolleys, moving in sequence), supported and guided preferably by means of grooved wheels 50, which are engaged on and embrace a rail 52, strictly parallel to the alignment defined by the joining of the centres of the mandrels 18a and 18b, and further supported by tyred wheels 54 running on a plane track 56 (FIG. 5) parallel to the rail 52, is suitably motorized. For example this trolley comprises a motor 58 which operates through a suitable transmission 60 at least one of the said wheels. The motor is the type with varying speeds, and/or the transmission comprises a variator, in such a way that the moving speed of the trolley can be predetermined and regulated.

This trolley, fed for example by means of stationary conductors and sliding blocks or "trolleys", or else by means of flexible cables, can in its turn be interlocked to the electric control board 44 or to a command system for regulating and programming so as to predetermine and automate the operative phases.

The trolley includes a suitable platform 62 (FIG. 4) on which one or more operators can remain for constant visual control of the regular development of the manufacturing process of the article 14. The operator, (who can if necessary position and manually present the bobbin 22 from which the tape 12 to be wound unwinds, in a position agreeing with the moving direction of the trolley - one of these positions being shown by the broken line 12') has at his disposal control means, in particular to bring to a halt all the motored means of the plant, in case of emergency or an established irregularity in the carrying out of the operation.

The plant is provided with suitable safety measures for the protection of the operators and the assistants. For example at both sides of the line, in particular on the side where the trolley or trolleys run, means for protection can be placed, as well as safety measures such as one or more stretched wires at the height of a man and supported in such a way that if they should be moved, due for example to a person getting dangerously close, the equipment would come to a halt and/or activate alarm and warning signals.

However, given that the equipment has been described only in an exemplary and limitative way and with the sole purpose of demonstrating the essential characteristics and main advantages of the invention, it must be understood that this equipment could be operated using different specific constructive solutions, according to the different needs, conditions and requirements of production, installation and service, without exceeding the scope of this invention, in particular as defined in any one or more of the appended claims.

I claim:

1. The method of fabricating as a continuous whole an extremely elongated hose which comprises steps of:
   (i) rotating a correspondingly elongated cylindrical core by independently driving each of the core ends at a fixed speed with a separate motive means and maintaining said separate motive means in synchronism with each other whilst supporting said core simultaneously externally at plural positions intermediate its ends and applying force axially to said core to tension it,
   (ii) moving, at constant speed along a path parallel to said core a carrier having a bobbin with a length of rubber tape wound thereon, and
   (iii) feeding said length of tape from said bobbin onto said core, as the core rotates, thereby to form a helix building a hose on said core.

* * * * *